United States Patent
Yamamoto

(10) Patent No.: US 10,067,598 B2
(45) Date of Patent: Sep. 4, 2018

(54) INFORMATION PROCESSING APPARATUS, INPUT CONTROL METHOD, METHOD OF CONTROLLING INFORMATION PROCESSING APPARATUS

(71) Applicant: CANON KABUSHIKI KAISHA, Tokyo (JP)

(72) Inventor: Keiichi Yamamoto, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/221,001

(22) Filed: Jul. 27, 2016

(65) Prior Publication Data

US 2017/0031500 A1    Feb. 2, 2017

(30) Foreign Application Priority Data

Jul. 29, 2015   (JP) .................. 2015-149623

(51) Int. Cl.
*G06F 3/041*  (2006.01)
*G06F 3/0488*  (2013.01)

(52) U.S. Cl.
CPC .......... *G06F 3/0416* (2013.01); *G06F 3/0488* (2013.01)

(58) Field of Classification Search
CPC .. G06F 3/044; G06F 3/04883; G06F 3/03547; G06F 3/0416; G06F 3/0488; G06F 3/041; G06F 2203/04808; G06F 2203/04104
See application file for complete search history.

(56) References Cited

U.S. PATENT DOCUMENTS

| | | | |
|---|---|---|---|
| 2011/0074694 A1* | 3/2011 | Rapp | G06F 3/04845 345/173 |
| 2011/0310026 A1* | 12/2011 | Davis | G06F 3/0488 345/173 |
| 2012/0174005 A1* | 7/2012 | Deutsch | G06F 3/04817 715/764 |
| 2012/0229471 A1 | 9/2012 | Takai | |
| 2013/0069868 A1* | 3/2013 | Kobori | G06F 3/04845 345/157 |
| 2013/0249829 A1 | 9/2013 | Hitosuga | |

(Continued)

FOREIGN PATENT DOCUMENTS

| | | |
|---|---|---|
| EP | 2290506 A1 | 3/2011 |
| JP | 2014-021787 A | 2/2014 |
| WO | 2011/021344 A1 | 2/2011 |

OTHER PUBLICATIONS

European Search Report issued in corresponding application No. 16001637.4 dated Jan. 9, 2017.

*Primary Examiner* — Benjamin C Lee
*Assistant Examiner* — Dong Hui Liang
(74) *Attorney, Agent, or Firm* — Carter, DeLuca, Farrell & Schmidt, LLP

(57) ABSTRACT

An information processing apparatus repeatedly detects a touch position to be input to an input surface and causes movement reflecting a change of the touch position detected on an image displayed on a display. The information processing apparatus does not reflect the change of the touch position to be detected during a time period during which a predetermined condition is satisfied after the touch position detected rests for a predetermined time period or longer on the image displayed.

15 Claims, 5 Drawing Sheets

(56) References Cited

U.S. PATENT DOCUMENTS

| | | | |
|---|---|---|---|
| 2013/0293490 A1* | 11/2013 | Ward | G06F 3/0488 345/173 |
| 2015/0054735 A1 | 2/2015 | Nakama | |
| 2015/0160818 A1 | 6/2015 | Takamiya | |

* cited by examiner

INFORMATION PROCESSING APPARATUS, INPUT CONTROL METHOD, METHOD OF CONTROLLING INFORMATION PROCESSING APPARATUS

BACKGROUND OF THE INVENTION

Field of the Invention

The present disclosure relates to an information processing apparatus which allows input using graphical user interface (GUI).

Description of the Related Art

A touch panel comprising a display and a touch pad as a position detection sensor allows an input operation using GUI. When performing the input operation through GUI, a user operates GUI parts such as a cursor and a slider bar displayed on a display using a pointer such as a finger, a stylus etc. The cursor is used, for example, to determine a start point and an end point when selecting a character string. The slider bar is used, for example, to adjust volume and brightness of the screen. In the information processing apparatus comprising the touch panel as an input device, a position touched by the pointer is detected by the touch pad. Then, processing in accordance with the GUI parts corresponding to the position is performed.

When determining a cursor position by the pointer, generally, while the pointer is touching the touch pad, the cursor position follows the touch position. When the pointer is separated from the touch pad, the cursor stops at a position just before the separation. In case of selecting the character string, the stop position of the cursor is recognized as the end position. Japanese Patent Application Laid-open No. 2014-021787 discloses a device which easily and surely selects the character string using the pointer. The device uses an icon for selecting the character string. The user touches the icon using the pointer to move. Then, when the user separates the pointer from the icon, the character string is selected. The character string within the range of the movement of the icon moved by the pointer will be the selected character string. United States Patent Application Publication No. 2012/229471 discloses a drawing system in which, when a rest time of the cursor or a rest time of the touch position touched by the pointer exceeds threshold, a cursor position at that point is recognized as an end point.

In case where the cursor position is determined with the icon, when the pointer is separated from the touch pad, slight blurring sometimes occurs. Further, when a pointer such as a finger, a contact area of which with the touch pad is large, is used, when separating the pointer from the touch pad, sometimes, a contact part of the pointer does not separate from the touch pad at the same timing. This is detected as a slight change of the touch position, which causes movement of the cursor position without intention. By determining a position at which the pointer rests by a time period exceeding the threshold as the cursor position, displacement of the cursor position caused by the blurring caused when separating the pointer from the touch pad can be prevented.

However, even when the user gets lost in moving the cursor position and the touch position of the pointer rests, the cursor position is determined. In this case, the user needs to select the character string again from the beginning. Further, if a large value is set as the threshold of the rest time considering the case where the user gets lost, it is necessary to rest the pointer for a long time to determine the cursor position, which causes deterioration of operability. The main purpose of the present invention is to provide an information processing apparatus with an increase of operability when determining the cursor position.

SUMMARY OF THE INVENTION

An information processing apparatus according to the present invention comprises a position detection unit configured to repeatedly detect a touch position to be input to an input surface; and a control unit configured to cause movement reflecting a change of the touch position to be detected by the position detection unit on an image displayed on a display, wherein the control unit is further configured not to cause, on the image displayed, movement reflecting the change of the touch position detected during a time period during which a predetermined condition is satisfied after the touch position to be detected by the position detection unit rests for a predetermined time period or longer.

Further features of the present invention will become apparent from the following description of exemplary embodiments (with reference to the attached drawings).

DESCRIPTION OF THE EMBODIMENTS

In the following, embodiments are described in detail with reference to the accompanying drawings. It is noted that the components described in the present embodiment is simply the illustration and the scope of the present invention is not limited to the components.

Figure 1A:
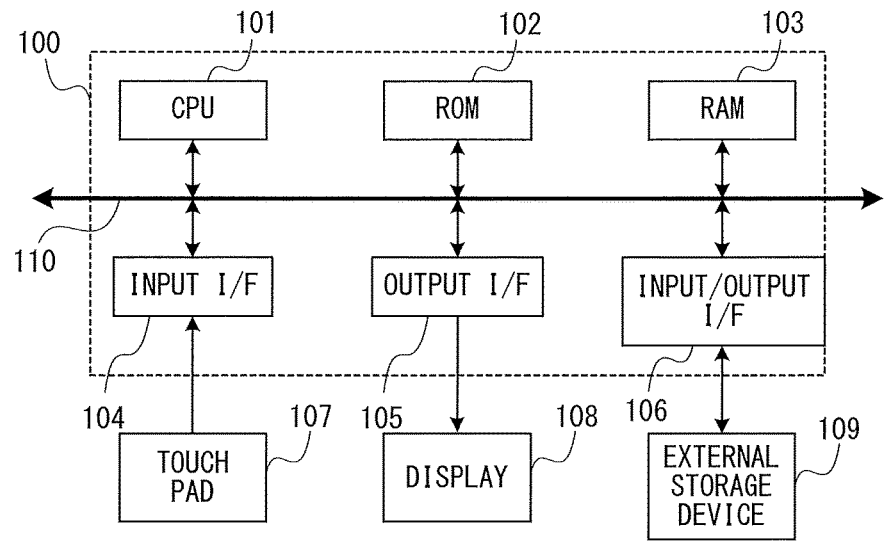
FIGS. 1A and 1B are explanatory diagrams explaining of an information processing apparatus.
Figure 1B:
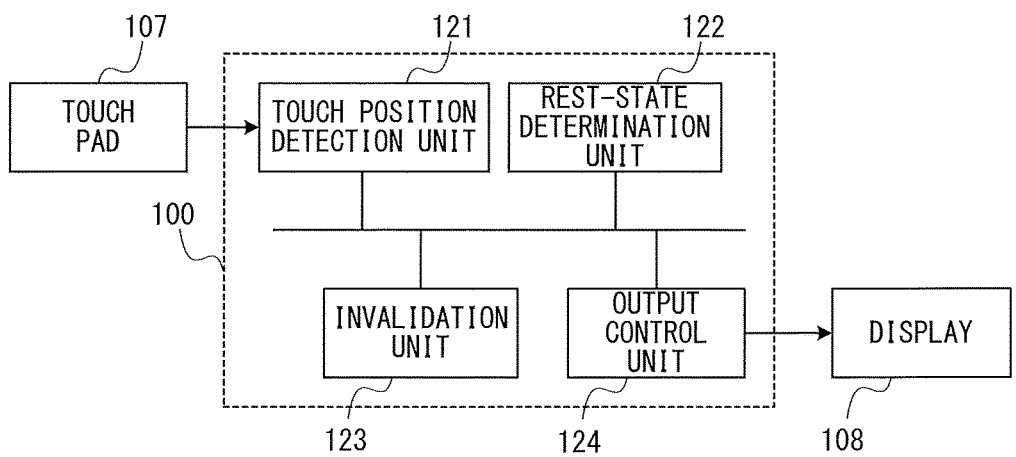

FIGS. 1A and 1B are explanatory diagrams explaining of an information processing apparatus of the present embodiment. FIG. 1A is a hardware configuration diagram of the information processing apparatus. An information processing apparatus 100 is connected to a touch pad 107, a display 108 and an external storage device 109. The touch pad 107 is, for example, a sheet-like position detection sensor with high permeability, which is arranged on a display screen of the display 108. Due to this, the touch pad 107 and the display 108 are integrally configured to form a touch panel. The information processing apparatus 100 can be realized, for example, by tablet terminals and smart phones, in which the touch pad 107, the display 108, and the external storage device 109 are integrally configured.

The pointer such as the finger, the stylus etc. touches the touch pad 107. Then, the touch pad 107 detects the touch position on the touch pad 107 touched by the pointer. The touch pad 107 sends data representing the touch position detected to the information processing apparatus 100. The touch pad 107 detects the touch position by, for example, a resistive film type, an electrostatic capacitance type, an infrared type, an ultrasonic type, an acoustic type, a vibration detection type etc. In addition to the touch pad 107, the touch position of the pointer may be detected using a position detection device for a three-dimensional space such as a distance image sensor, a stereo camera etc. as the position detection sensor.

The display 108 displays the GUI parts and results of various processing performed by the information processing apparatus 100. The display 108 is, for example, a liquid crystal display, a TV monitor, a projector etc. In the present embodiment, the electrostatic capacitance type is employed for the touch pad 107 and the liquid crystal displayed is used for the display 108. A surface of the touch pad 107 arranged on the display 108 is an input surface. The pointer contacts the input surface.

The external storage device 109 stores data and computer program processed by the information processing apparatus 100. The external storage device 109 can be realized, for example, by a medium (recording medium) and an external storage drive for realizing access to the medium. For example, hard disk, flexible disk (FD), CD-ROM, DVD, USB memory, magnet optical disk (MO), flash memory etc. are known as the medium. Further, the external storage device 109 may be a server etc. connected via network.

The information processing apparatus 100 comprises a central processing unit (CPU) 101, a read only memory (ROM) 102, a random access memory (RAM) 103, an input interface (I/F) 104, an output I/F, and an input/output I/F 106. The CPU 101, the ROM 102, the RAM 103, the input I/F 104, the output I/F 105, and the input/output I/F 106 are communicably connected via a bus 110.

The CPU 101 reads the computer program from the ROM 102 and the external storage device 109 and executes the program. The CPU 101 executes the computer program using the RAM 103 as a work area. Due to this, the CPU 101 controls operation of the information processing apparatus 100.

The input I/F 104 performs interface control of the touch pad 107 with the information processing apparatus 100. For example, the input I/F 104 obtains data representing touch position of the pointer from the touch pad 107 and sends the data to the CPU 101.

The output I/F 105 performs interface control of the display 108 with the information processing apparatus 100. For example, in accordance with an instruction from the CPU 101, the output I/F 105 sends data for displaying the GUI parts and the various processing results on the display 108. The display 108 displays an image corresponding to the data to be obtained from the output I/F 105.

The input/output I/F 106 performs interface control of the external storage device 109 with the information processing apparatus 100. For example, the input/output I/F 106 obtains computer program and data from the external storage device 109 and sends the data to the CPU 101. In accordance with the instruction from the CPU 101, the input/output I/F 106 stores the data in the external storage device 109.

FIG. 1B is a function block diagram of the information processing apparatus 100. The information processing apparatus 100 realizes each function by executing, by the CPU 101, the computer program. The information processing apparatus 100 functions as a touch position detection unit 121, a rest-state determination unit 122, an invalidation unit 123, and an output control unit 124. At least a portion of these functions may be realized by hardware. In this functional block, processing with regard to detecting the touch position on the input surface touched by the pointer is performed. Also, processing with regard to displaying an image representing change of the cursor position in accordance with the touch is performed.

Based on data to be obtained from the touch pad 107 through the input I/F 104, the touch position detection unit 121 detects the touch position on the input surface touched by a user with the pointer. In the present embodiment, the touch position detection unit 121 obtains data at a predetermined time interval from the touch pad 107 through the input I/F 104. In addition to the touch position, data to be obtained by the touch position detection unit 121 through the input I/F 104 includes detection time of the touch position. When the pointer is separated from the input surface, the touch position detection unit 121 obtains data representing that no touch position is detected from the touch pad 107.

Based on the touch position and the detection time detected by the touch position detection unit 121, the rest-state determination unit 122 detects whether the touch position of the pointer rests or not. If it is detected that the touch position rests, the rest-state determination unit 122 sets a rest-state flag, representing a rest state of the touch position, ON. For example, if it is within a predetermined distance that the touch position changes during a predetermined time period, the rest-state determination unit 122 detects that the touch position of the pointer rests. In the following, the predetermined time period is referred to as "rest-state determination time period". The rest-state determination time period is a time period allowing the rest-state determination unit 122 to simply determine the rest state for determining the cursor position, which is, for example, 200 milliseconds. In the following, the predetermined distance is referred to as "movement determination threshold". To allow slight blurring of the pointer, the movement determination threshold is, for example, 1.5 [mm]. In case of the cursor position for selecting the character string, if the touch position does not move to the next character, the rest-state determination unit 122 detects the rest state of the touch position. Similarly, in case of the slider bar, if the touch position does not move to the next scale position, the rest-state determination unit 122 detects the rest state of the touch position.

The invalidation unit 123 determines movement of the touch position during a time period during which a predetermined invalidation condition is satisfied after the rest-state determination unit 122 detects the rest state of the touch position as invalid. Then, if the invalidation condition is no longer satisfied, the invalidation unit 123 determines the movement of the touch position as valid. In the present embodiment, the invalidation condition is a time period from when the touch position restarts to move after the touch position is determined to have rest (hereinafter referred to as "invalidation time period"). For example, if the movement of the touch position is detected and the blurring occurs when the pointer is separated from the input surface after the rest-state flag is set ON, and if the blurring occurs within the invalidation time period, the invalidation unit 123 determines the movement of the touch position corresponding to the blurring as invalid. The invalidation time period is a time period from when the pointer restarts to move after the pointer rests to when the pointer separates from the input surface, which is, for example, about 100 milliseconds. After a lapse of the invalidation time period, the invalidation unit 123 determines the movement of the touch position as valid and sets the rest-state flag ON. Thereby, if the touch position continues to move after the lapse of the invalidation time period, the information processing apparatus 100 determines that the movement of the pointer which is temporarily stopped is restarted by the user.

The output control unit 124 generates an image in accordance with the touch position of the pointer to be detected by the touch position detection unit 121 and displays the image on the display 108. While the invalidation unit 123 determines the movement of the touch position as invalid, the output control unit 124 displays an image which invalidates the movement of the touch position during this time period on the display 108. The image in accordance with the touch position of the pointer is, for example, the image of the cursor following the touch position.

Figure 2:
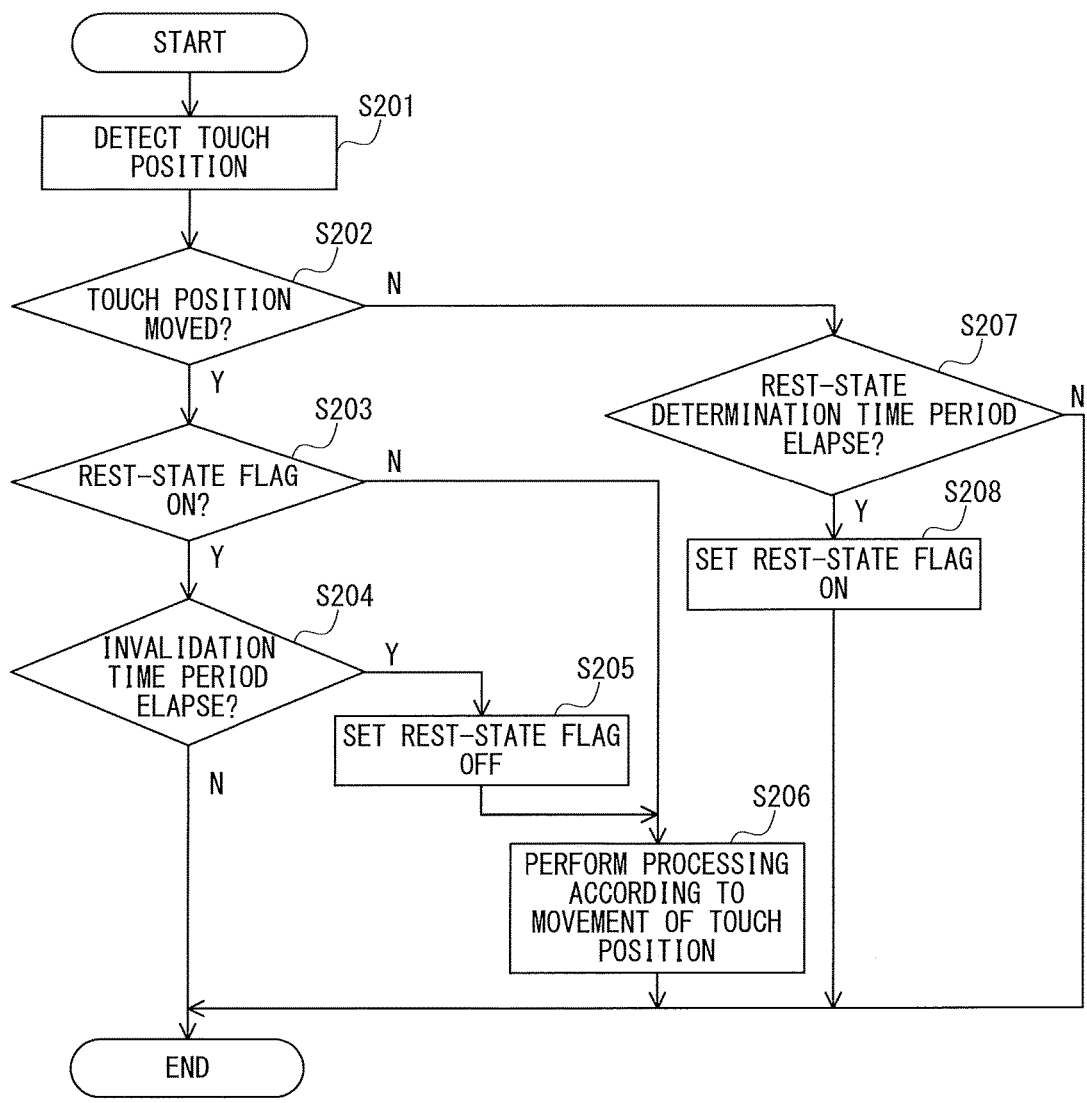
FIG. 2 is a flowchart representing input control processing in accordance with touch of the pointer to an input surface.

FIG. 2 is a flowchart representing input control processing in accordance with the touch of the pointer to the input surface performed by the information processing apparatus 100. The processing is performed by obtaining, by the input I/F 104, data from the touch pad 107.

Based on the data obtained from the touch pad 107 through the input IF 104, the touch position detection unit 121 detects the touch position of the pointer on the input surface (STEP S201). The touch position detection unit 121 stores the touch position detected with its detection time in the RAM 103. If the data obtained from the touch pad 107 indicates that no the touch position is detected, the touch position detection unit 121 stores that no touch position is detected in the RAM 103.

The rest-state determination unit 122 refers the RAM 103 and determines whether the touch position detected in the touch position detection unit 121 is moved or not (STEP S202). Depending on whether the touch position is moved from the touch position previously obtained exceeding the movement determination threshold or not, the rest-state determination unit 122 determines the movement of the touch position. If it is determined that the touch position is moved (STEP S202: Y), the invalidation unit 123 determines whether the rest-state flag is ON or not (STEP S203). If it is determined that the rest-state flag is ON (STEP S203: Y), the invalidation unit 123 determines whether the invalidation time period elapses or not (STEP S204). If it is determined that the invalidation time period does not elapse (STEP S204: N), the information processing apparatus 100 ends the processing as it is. It means that if the determination result in STEP S204 is "NO", the movement of the touch position will not be used as effective operation information to move the cursor or the slide bar. In this manner, in the present embodiment, the invalidation unit 123 determines not to use the movement of the touch position generated within the invalidation time period as the operation information. In other words, the movement of the touch position generated within the invalidation time period will be invalidated.

If it is determined that the invalidation time period elapses (STEP S204: Y), the invalidation unit 123 sets the rest-state flag OFF (STEP S205). If it is determined that the rest-state flag is OFF (STEP S203: N) or after the invalidation unit 123 sets the rest-state flag OFF, the output control unit 124 generates the image with the cursor position moved based on the movement of the touch position and displays the image on the display 108 (STEP S206). It means that if the determination result in the STEP S204 is "YES", the movement of the touch position will be used as the effective operation information.

If it is determined that the touch position is not moved (STEP S202: N), the rest-state determination unit 122 refers the RAM 103 and determines whether the rest-state determination time period elapses or not after the touch position rests (STEP S207). If it is determined that the rest-state determination time period does not elapse (STEP S207: N), the information processing apparatus 100 ends the processing as it is. If it is determined that the rest-state determination time period elapses (STEP S207: Y), the rest-state determination unit 122 sets the rest-state flag ON (STEP S208). If the rest-state flag is set ON, the information processing apparatus 100 ends the processing.

If the pointer moves while keep touching the input surface, the information processing apparatus 100 as mentioned displays the image of the cursor following the movement of the touch position by the pointer on the display 108. If the pointer rests, even the touch position of the pointer restarts to move, if the movement is restarted within the invalidation time period, the information processing apparatus 100 invalidates the movement. If the touch position of the pointer moves after the lapse of the invalidation time period, the information processing apparatus 100 determines the cursor position based on the movement.

Figure 3A:
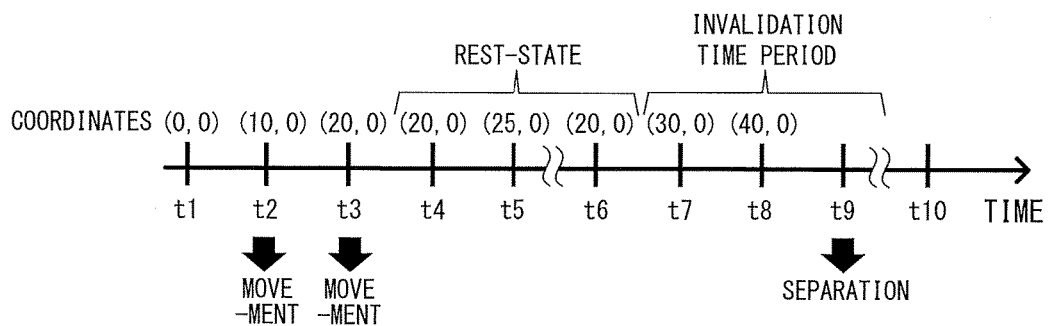
FIGS. 3A, 3B, and 3C are explanatory diagrams explaining touch position at each time.
Figure 3B:
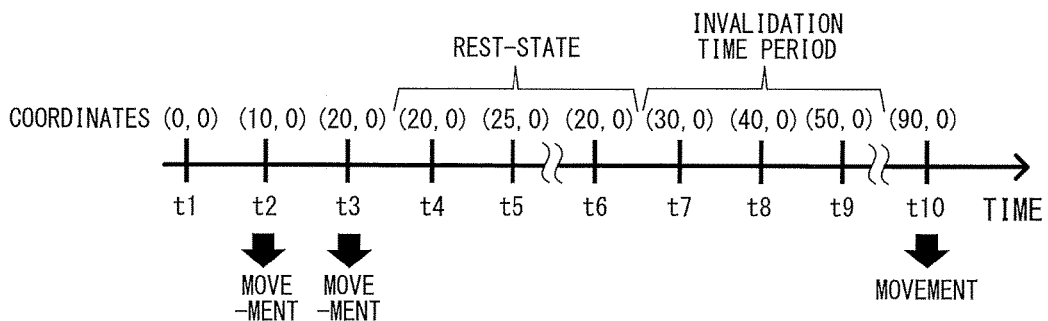
Figure 3C:
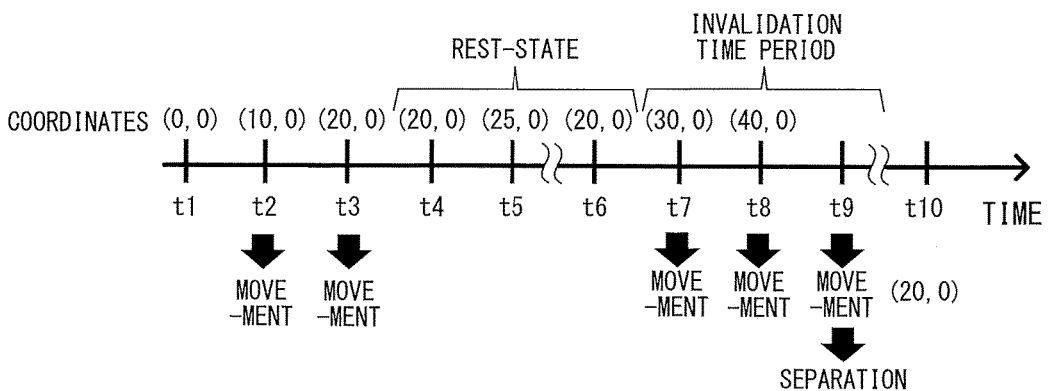
Figure 4A:
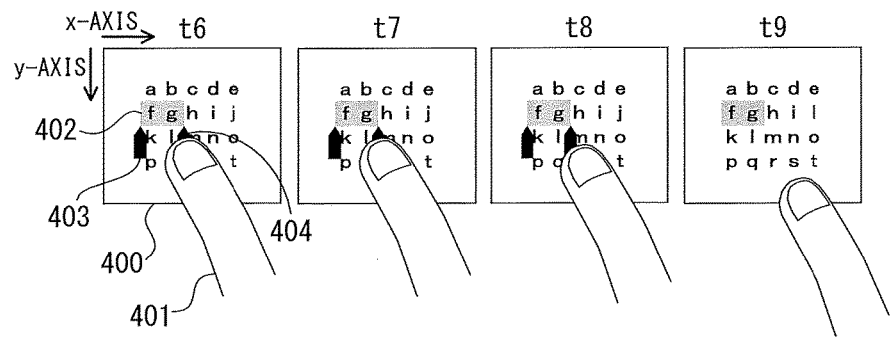
FIGS. 4A, 4B, and 4C are diagrams illustrating images displayed on a display.
Figure 4B:
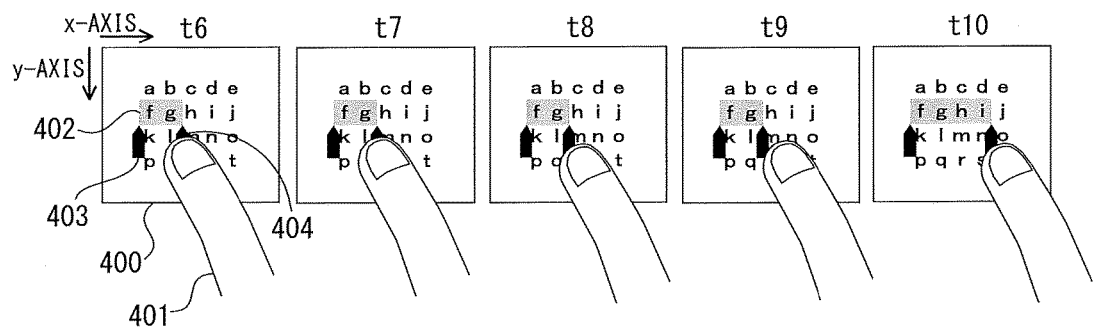
Figure 4C:
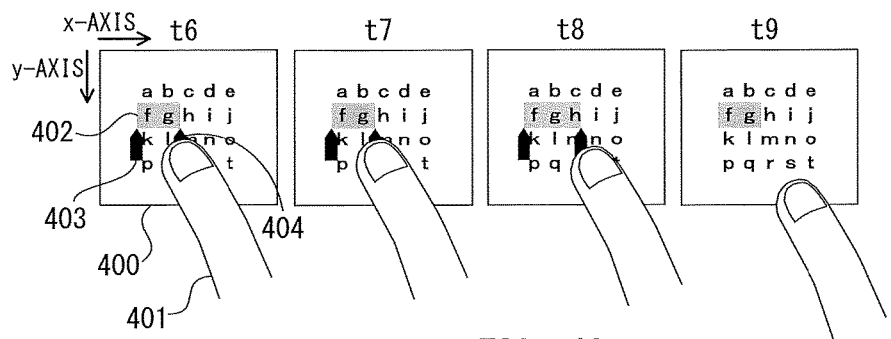

A particular example of the processing performed by the information processing apparatus 100 to the user's operation with the pointer is explained. FIGS. 3A to 3C are explanatory diagrams of the touch position at each time from a start of touch to an end of touch to the input surface with the pointer. FIGS. 4A to 4C are exemplary diagrams of the image displayed on the display 108 when touching the input surface with the pointer. The explanatory diagram in FIG. 3A corresponds to the exemplary diagram of the image in FIG. 4A. The explanatory diagram in FIG. 3B corresponds to the exemplary diagram of the image in FIG. 4B. The explanatory diagram in FIG. 3C corresponds to the exemplary diagram of the image in FIG. 4C.

FIGS. 3A to 3C represent coordinates of the touch position, in which the touch position at time t1 when the start of touch to the input surface with the pointer is detected is defined as origin (0, 0). Portions where no coordinates are described represent that no touch position is detected. The coordinates are represented by dot in accordance with the resolution of the display 108. In the present embodiment, time interval during which the input I/F 104 obtains data (touch position) from the touch pad 107 is 20 milliseconds. The respective time intervals from time t1 to time t5 and from time t6 to time t9 are 20 milliseconds.

FIGS. 4A to 4C are images to be represented on the display 108 from time t5 to time t10 in FIGS. 3A to 3C. The display 108 is a touch panel which is integrally configured with the touch pad 107, so the display surface of the display 108 overlaps with the input surface 400. In the drawings, a lateral direction of the display 108 is defined as x-axis and a vertical direction of the display 108 is defined as Y-axis. The touch position is represented by the coordinates of X-axis and Y-axis. The coordinates of the touch position in FIGS. 3A to 3C correspond to the coordinates.

When the touch operation is performed on the input surface 400 by the pointer of a user's finger 401, the character string is selected. The character string which is being selected currently is represented as a character string selection range 402, in which the selected character string is filled and the like. A start position icon 403 indicates a start position of the character string selection range 402. An end position icon 404 indicates an end position of the character string selection range 402.

A particular example of the processing in FIG. 2 is explained using FIGS. 3A to 3C and FIGS. 4A to 4C. In FIGS. 3A and 3B, at time t1, the user touches the input surface 400 with the finger 401. At time t2 and time t3, the user moves the finger 401 to the position of the end position icon 404 while keep touching the input surface 400 with the finger 401. At time t4 to time t6, the user stops the finger 401 at the position of the end position icon 404 of the input surface 400.

At the time t1, the user touches the input surface 400 with the finger 401. The input I/F 104 obtains data representing the touch position from the touch pad 107 and inputs the data in the touch position detection unit 121. Based on the data obtained, the touch position detection unit 121 detects the coordinates (0, 0) as the touch position (STEP S201). The time t1 is a time when the touch is started, at which no movement of the touch position is generated. In addition, the rest-state determination time period of the touch position does not elapse. Thereby, the information processing apparatus 100 ends the processing (STEP S202: N, STEP S207: N). The time t1 is the start point of the touch operation. Thereby, the output control unit 124 displays the start position icon 403 at the coordinates (0, 0).

At the time t2, the user moves the finger 401 to the coordinates (10, 0) while keep touching the input surface 400 with the finger 401. The input I/F 104 obtains the data from the touch pad 107 when 20 milliseconds elapse from the time t1. Due to this, the touch position detection unit 121 detects the coordinates (10, 0) as the touch position (STEP S201). At the time t2, the touch position is moved 10 dots in the x-axis direction. If a movement distance of the touch position between the touch position at the time t1 and the touch position at the time t2 exceeds the movement determination threshold, the rest-state determination unit 122 determines that the touch position is moved. In the present embodiment, the movement determination threshold value is 10 dots. In this example, the movement distance is 10 dots. Thereby, the rest-state determination unit 122 determines that the touch position is moved (STEP S202: Y). The invalidation unit 123 confirms the rest-state flag (STEP S203). The rest-state flag is set OFF as initial value. At the point of the time t2, no rewriting is performed. Thereby, the invalidation unit 123 confirms that the rest-state flag is OFF (STEP S203: N). The output control unit 124 generates the image with the cursor moved to the coordinates (10, 0) of the touch position and displays the image on the display 108 (STEP S206).

At the time t3, the user moves the finger 401 to the coordinates (20, 0) while keeping touching the input surface 400 with the finger 401. The processing performed in this case is similar to the case performed at the time t2, so the description is omitted.

At the time t4, the user stops moving the finger 401 while keep touching the input surface 400 with the finger 401. The input I/F 104 obtains the data representing the same touch position as that obtained at the time t3 from the touch pad 107 when 20 milliseconds elapse from the time t3. Due to this, the touch position detection unit 121 detects the coordinates (20, 0) as the touch position (STEP S201). As the movement distance of the touch position between the touch position at the time t3 and the touch position at the time t4 is less than the movement determination threshold, the rest-state determination unit 122 determines that the touch position is not moved (STEP S202: N). As the rest state of the touch position is just detected and the rest-state determination time period does not elapse, the rest-state determination unit 122 ends the processing as it is (STEP S207: N).

At the time t5, the user almost rests the finger 401. In the present embodiment, a distance from a position where is lastly determined as the movement is defined as the movement distance. Thereby, based on the distance from touch position at the point of the time t3, whether the touch position is moved or not at the time t5 is determined. At the time t5, the movement distance from the touch position of the time t3 is 5 dots, which is less than the movement determination threshold. Thereby, the rest-state determination unit 122 determines that the touch position is not moved (STEP S202: N). The rest-state determination unit 122 determines whether the rest-state determination time period elapses or not after the touch position rests (STEP S207).

The rest time of the touch position is calculated by, for example, storing the time when the rest state of the touch position is detected (time t4) in the RAM 103. Then, every time the rest state of the touch position is detected, based on the time of the detection of the rest state and the time stored in the RAM 103, the rest time of the touch position is calculated. For example, the rest-state determination unit 122 stores the time in the RAM 103 and calculates the rest time of the touch position when performing the processing of the step S207. Based on the rest time of the touch position and the rest-state determination time period, the rest-state determination unit 122 determines the lapse of the rest-state determination time period (STEP S207). In the present embodiment, the rest-state determination time period is 200 milliseconds. At the point of the time t5, 20 milliseconds elapses after the touch position rests, however, the rest time does not exceed 200 milliseconds. Thereby, the rest-state determination unit 122 ends the processing as it is (STEP S207: N).

It is considered that the finger 401 restarts to move and rests again. Thereby, the rest-state determination unit 122, for example, may set the flag ON when the movement is generated. Then, at STEP S207, when the flag is ON, the time at that point may be stored and the flag may be set ON. In this manner, when the movement of the finger 401 is generated, the time at that point is stored again and the rest-state determination is performed. When the movement of the touch position is detected, the rest-state determination unit 122 recognizes that the rest state is released and deletes the time stored in the RAM 103. Alternatively, when starting or ending the touch operation or when touching the input surface 400 with the finger 401 or separating the finger 401 from the input surface 400, the rest-state determination unit 122 deletes the time stored in the RAM 103. Further, in the present embodiment, the data representing the touch position is obtained at equal time intervals, which may be used, by the rest-state determination unit 122, to measure the rest time based on the number of times the data is obtained.

At the time t6, 180 milliseconds elapse from the time t5 while keeping the rest state. The user keeps stopping moving the finger 401. The touch position detection unit 121 detects the coordinates (20, 0) as the touch position (STEP S201). As the movement distance to the touch position at the time t3 is 0 dot, the rest-state determination unit 122 determines that the touch position is not moved (STEP S202: N). As 200 milliseconds elapse from the time t4 when the touch position first rests, the rest-state determination unit 122 determines that the rest-state determination time elapses (STEP S207: N). The rest-state determination unit 122 sets the rest-state flag ON and ends the processing (STEP S208).

As shown in time t6 of FIGS. 4A to 4C, the character string selection range 402 selects "fg" in accordance with the operation performed from the time t1 to the time t6. At the time t6, the touch position is in the rest state so that it is recognized that the user selects the range of "fg". If the rest state continues, the similar processing performed at the time t6 is repeatedly performed.

In FIGS. 3A to 3C, movement of the finger 401 after time t7 varies. In FIGS. 3A and 3C, after the user rests the finger 401, the user separates the finger 401 from the input surface 400 within the invalidation time period (time t9). In FIG. 3B, the user restarts to move the finger 401 after the lapse of the invalidation time period.

A description is provided with regard to the processing performed after the time t7 in case of FIG. 3A. At the time t7, due to the blurring caused when the user separates the finger 401 from the input surface 400, the touch position moves. The touch position detection unit 121 detects the coordinates (30, 0) of the touch position (STEP S201). As the movement distance to the touch position at the time t3 is 10 dots, which exceeds the movement determination threshold of 10 dots, the rest-state determination unit 122 determines that the touch position is moved (STEP S202: Y). As the rest-state flag is ON at the point of the time t6 (STEP S203: Y), the invalidation unit 123 determines whether the invalidation time period elapses or not (STEP S204). As it is immediately after the determination of the rest state and the invalidation time period does not elapse (STEP S204: N), the invalidation unit 123 ends the processing as it is. Due to this, though the finger is moved 10 dots, the movement is invalidated so that the information processing apparatus 100 does not perform the processing based on this movement. Thereby, as shown at the time t7 in FIG. 4A, the position of the end position icon 404 does not move from the point of the time t6.

At time t8, due to the blurring caused when the user separates the finger 401 from the input surface 400, the touch position further moves from the touch position at the point of the time t7. The touch position detection unit 121 detects the coordinates (40, 0) of the touch position (STEP S201). The rest-state determination unit 122 determines that the touch position is moved because the movement distance to the touch position at the time t7 when the movement of the touch position is previously determined is 10 dots, which exceeds the movement determination threshold of 10 dots (STEP S202: Y). As the rest-state flag is ON at the point of time t6 (STEP S203: Y), the invalidation unit 123 determines whether the invalidation time period elapses or not (STEP S204). In the present embodiment, the invalidation time period is 100 milliseconds. At the point of the time t8, 20 milliseconds elapse, however, it does not exceed 100 milliseconds. Thereby, the invalidation unit 123 ends the processing as it is (STEP S204: N). Similar to the time t7, as shown at the time t8 of FIG. 4A, the cursor position does not move at the time t8.

The lapse time for the invalidation can be calculated by, for example, storing the time (for example, time t7) when the movement of the touch position is restarted after the touch position rests in the RAM 103. Then, every time processing to confirm the lapse of the invalidation time period is performed, based on the time when the confirmation processing is performed and the time stored in the RAM 103, the lapse time for the invalidation can be calculated. Based on whether the calculated lapse time exceeds the invalidation time period or not, the invalidation unit 123 performs the determination processing in STEP S204. The invalidation unit 123 deletes the time stored in the RAM 103, for example, when performing the processing of the step S205 performed after the lapse of the invalidation time period. Alternatively, the invalidation unit 123 deletes the time stored in the RAM 103 when starting or ending the touch operation or when touching the input surface or releasing from the input surface.

At the time t9, the user separates the finger 401 from the input surface 400. Thereby, the touch pad 107 no longer detects the touch position. Then, the touch pad 107 inputs data representing that no touch position is detected to the input I/F 104. In accordance with the data, the information processing apparatus 100 performs processing to determine the cursor position in a case where the finger 401 separates from the input surface 400. Due to this, the character string selection range 402 is determined. In the time t9 in FIG. 4A, the character string selection range 402 is determined as "fg". The time t9 in FIG. 4A shows that the character string selection range is determined. Thereby, the start position icon 403 and the end position icon 404 are deleted.

In this manner, even the pointer moves when separating the pointer (finger 401) from the touch pad 107 (input surface 400) after the touch position rests, due to the invalidation processing, the information processing apparatus 100 can determine the cursor position at the position where the user rests the pointer.

A description is provided with regard to processing after the time t7 in case of FIG. 3B. The processing performed to the time t8 is similar to the case of FIG. 3A, so the description is omitted.

At the time t9, the user restarts to move the touch position of the finger 401. At the time t9, 40 milliseconds elapse from the time t7, however, the invalidation time period of 100 milliseconds does not elapse. Thereby, at the time t9, similar processing performed at the time t8 is performed. At the time t9, the user moves the touch position of the finger 401 with intention, however, the information processing apparatus 100 does not perform processing based on the movement of the touch position. Thereby, as shown at the time t9 of FIG. 4B, the end position icon 404 does not follow the touch position of the finger 401.

At time t10, 60 milliseconds elapse from the time t9. During this time period, the user keeps moving the touch position of the finger 401. The touch position detection unit 121 detects the coordinates (90, 0) of the touch position (STEP S201). The movement distance of the touch position detected is 10 dots to the coordinates of the touch position where is previously determined as the movement. As the touch position is moved exceeding the movement determination threshold, the rest-state determination unit 122 determines that the touch position is moved (STEP S202: Y). As the rest-state flag is ON at the time t6 (STEP S203: Y), the invalidation unit 123 determines whether the invalidation time period elapses or not (STEP S204). As 100 milliseconds elapse from the time t7 when the movement is restarted is stored in the RAM 103, the invalidation unit 123 determines that the invalidation time period elapses (STEP S204: Y) and sets the rest-state flag OFF (STEP S205). The output control unit 124 normally performs the processing in accordance with the movement of the touch position to the coordinate (50, 0) (STEP S206). Due to this, as shown at the time t10 of FIG. 4B, the image of the end position icon 404 following the position of the finger 401 is displayed on the display 108. In the example of FIG. 4B, the character string selection range 402 is "fg" when the movement is temporarily stopped, which is changed to "fghi" due to the restart of the movement of the touch position. The user can restart to move the end position icon 404 to a desired position.

As mentioned, even after the touch position rests, after the lapse of the invalidation time period, the cursor position follows the movement of the touch position. Thereby, even the user restarts to move the touch position after the user temporarily stops the movement, the information processing apparatus 100 can display the image corresponding to the movement.

Figure 5:
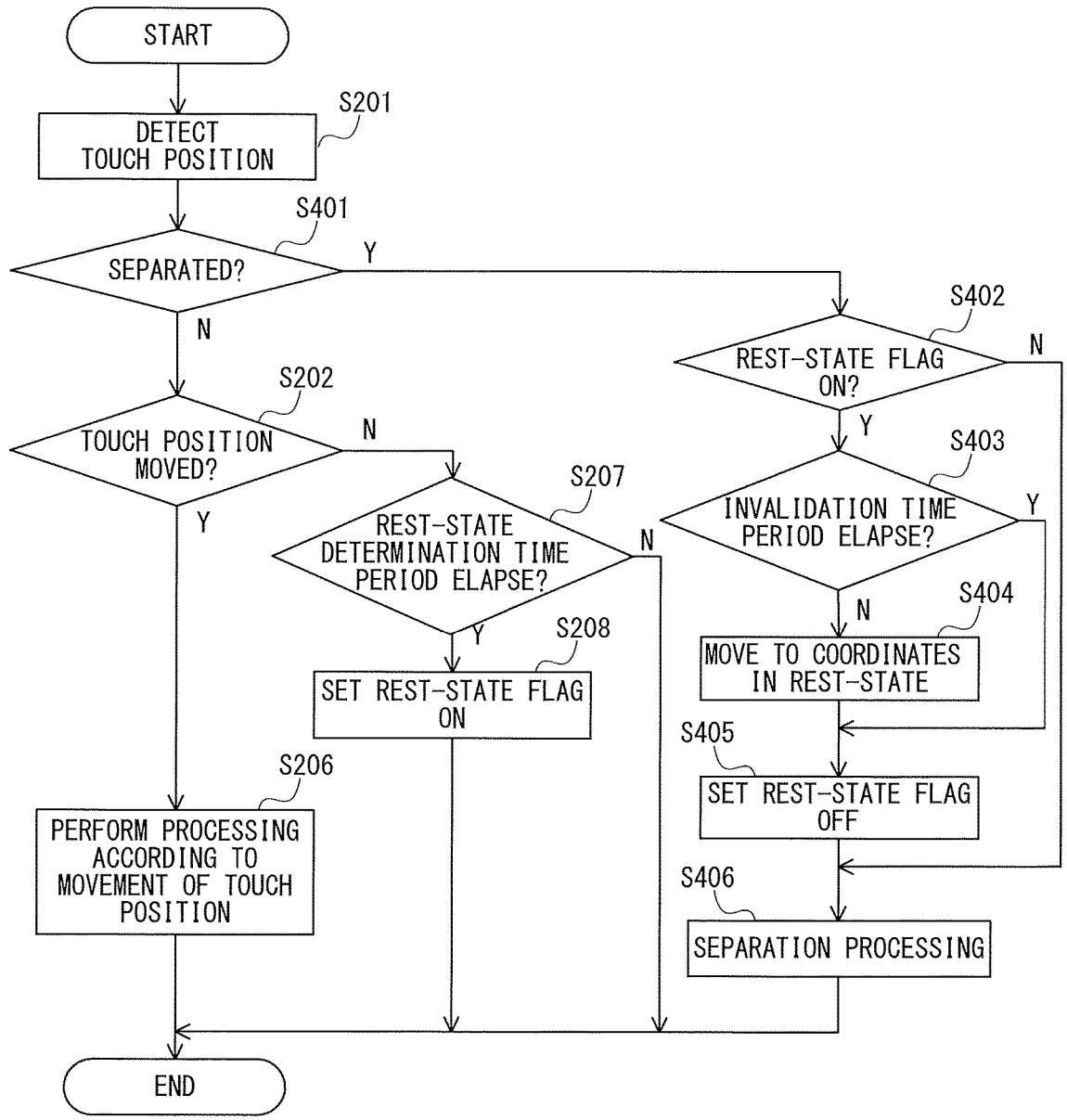
FIG. 5 is a flowchart representing input control processing in accordance with the touch of the pointer to the input surface.

In FIGS. 3A and 3B, while following the movement of the touch position, the movement of the touch position of the pointer (finger 401) within the invalidation time period is invalidated. It means that, to invalidate the movement of the touch position generated within the invalidation time period, the information processing apparatus 100 stops the cursor position at the touch position where is in the rest state before the invalidation time period is started. As the user's operation, FIG. 3C is similar to FIG. 3A. FIG. 3C, however, shows a case where the invalidation processing is performed after the pointer is separated from the input surface. This processing is explained using FIG. 4C and FIG. 5. FIG. 5 is a flowchart representing input control processing in accordance with the touch of the pointer to the input surface performed by the information processing apparatus 100. The same reference numerals are attached with regard to the same processing in FIG. 2.

If the coordinates of the touch position is detected by the touch position detection unit 121 (STEP S401: N), the information processing apparatus 100 determines, by the rest-state determination unit 122, whether the touch position is moved or not (STEP S202). If it is determined that the touch position is moved (STEP S202: Y), the output control unit 124 generates the image with the cursor position moved based on the movement of the touch position and displays the image on the display 108 (STEP S206).

If it is determined that the touch position is not moved (STEP S202: N), the rest-state determination unit 122 refers the RAM 103 and determines whether the rest-state determination time period elapses or not after the touch position rests (STEP S207). If it is determined that the rest-state determination time period does not elapse (STEP S207: N), the information processing apparatus 100 ends the processing. If it is determined that the rest-state determination time period elapses (STEP S207: Y), the rest-state determination unit 122 sets the rest-state flag ON (STEP S208). If the rest-state flag is set ON, the information processing apparatus 100 ends the processing.

If no touch position is detected, the touch position detection unit 121 determines that the pointer is separated from the input surface (STEP S401: Y). In this case, the invalidation unit 123 determines whether the rest-state flag is ON or not (STEP S402). If it is determined that the rest-state flag is ON (STEP S402: Y), the invalidation unit 123 determines whether the invalidation time period elapses or not (STEP S403). If it is determined that the invalidation time period does not elapse (STEP S403: N), the output control unit 124 moves the cursor position to a position where the rest state is started (STEP S404). If it is determined that the invalidation time period elapses (STEP S403: Y), or after the movement of the cursor position, the invalidation unit 123 sets the rest-state flag OFF (STEP S405). After the rest-state flag is set OFF, or if the rest-state flag is OFF (STEP S402: N), the information processing apparatus 100 performs processing for separation (STEP S406). Then, the processing ends.

A particular example of the processing in FIG. is explained using FIG. 3C and FIG. 4C. From the time t1 to the time t6, similar processing performed with regard to FIGS. 3A and 3B is performed. In the processing of step S401, whether the finger 401 is separated or not is determined. From the time t1 to the time t6, the finger 401 keeps touching the input surface 400 so that processing to determine the movement of the touch position is performed (STEP S202). At the time t1, the touch position does not move. In addition, the touch position does not rest. Thereby, the processing ends as it is (STEP S202: N, S207: N). At the time t2 and the time t3, the touch position is moved. Thereby, the image with the cursor position moved in accordance with the movement of the touch position is displayed on the display 108 (STEP S202: Y, S206). At the time t4 and the time t5, the touch position is not moved exceeding the movement distance threshold. In addition, the rest-state determination time period does not elapse. Thereby, the processing ends as it is (STEP S202: N, STEP S207: N). At the time t6, the touch position does not move and the rest-state determination period elapses. Thereby, the rest-state flag is set ON (STEP S202: N, STEP S207: Y, STEP S208).

At the time t7, the user moves the finger 401, with which the user touches the input surface 400. The touch position detection unit 121 detects the coordinates (30, 0) of the touch position. Since the finger 401 is not separated (STEP S401: N), the rest-state determination unit 122 obtains the movement distance from the position at the point of the time t3 when the movement of the touch position is previously determined. As the movement distance is 10 dots, which is the movement determination threshold or longer, the rest-state determination unit 122 determines that the touch position is moved (STEP S202: Y). The output control unit 124 generates the image with the cursor position moved based on the movement of the cursor position and displays the image on the display 108 (STEP S206). As shown at the time t7 in FIG. 4C, though the touch position moves, movement amount is not enough for the cursor to move to the next character, the position of the end position icon 404 does not change.

Similar processing performed at the time t7 is performed at the time t8 though, compared with the touch position at the time t7, the touch position is further moved 10 dots. Thereby, as shown at the time t8 in FIG. 4C, the position of the end position icon 404 moves to the next character. Due to this, the character string selection range 402 will be "fgh". In this manner, even after the touch position rests, it can immediately follow the movement of the touch position.

At the time t9, the user separates the finger 401 from the input surface 400. The touch position detection unit 121 cannot detect the coordinates of the touch position. Thereby, the touch position detection unit 121 determines that the finger 401 is separated from the input surface 400 (STEP S401: Y). The invalidation unit 123 confirms the rest-state flag (STEP S402). As the rest-state flag is ON at the point of the time t6 (STEP S402: Y), the invalidation unit 123 determines whether the invalidation time period elapses or not (STEP S403). Whether the invalidation time period elapses or not is determined by, for example, storing the time (time t7) when the movement of the touch position is restarted after the touch position rests in the RAM 103. Then, every time processing to determine the lapse of the invalidation time period is performed, it is determined whether the lapse time from the time stored in the RAM 103 to the time when the determination processing is performed is longer than the invalidation time period or not. The time stored in the RAM 103 is deleted when performing the processing at the step S405 or when starting the touch operation.

As 40 milliseconds elapse from the time t7 at the time t9, which does not exceed the invalidation time period of 100 milliseconds, the invalidation unit 123 determines that the invalidation time period does not elapse (STEP S403: N). The output control unit 124 stores, for example, the touch position (20, 0) at the time t4 when the rest state is started in the RAM 103 as coordinates in the rest state. Then, the output control unit 124 displays the image with the cursor moved to the coordinates in the rest state on the display 108 (STEP S404). Thereby, the image which invalidates the movement of the touch position after the touch position rests is displayed. Even the touch position is moved at the time t7 and the time t8, it is possible to return the cursor at the touch position at the time t4 when is in the rest state.

The invalidation unit 123 sets the rest-state flag OFF (STEP S405). The output control unit 124 performs cursor position determination processing which is performed when the finger 401 separates from the input surface 400 (STEP S406). Thereby, as shown in the time t9 in FIG. 4C, the position of the end position icon 404 returns to the touch coordinates at the time t4 when is in the rest state. Then, the character string selection range 402 of "fgh" at the time t8 returns to the character string selection range 402 of "fg" which the user desires.

If the finger 401 is separated from the input surface 400 after the lapse of the invalidation time period (STEP S403: Y), the processing at the step 404 is not performed and the rest-state flag is turned OFF. Then, the cursor position determination processing is performed (STEP S405, STEP S406). If the finger 401 is separated from the input surface 400 without stopping the movement STEP 402: N), the rest-state flag is not turned ON and then, the cursor position determination processing is performed (STEP S406). In this manner, the movement of the touch position within the invalidation time period is reflected.

As mentioned, the information processing apparatus 100 according to the present embodiment determines the rest state of the touch position when the touch position rests exceeding the rest-state determination time period. Then, during the invalidation time period, the information processing apparatus 100 invalidates the movement of the touch position after the touch position rests. Due to this, the blurring caused when the pointer is separated from the touch pad 107 can be invalidated. As the cursor position is determined in accordance with the touch position when the pointer rests, the cursor position is determined at the position where the user desires. Further, when the touch position of the pointer moves exceeding the invalidation time period, as the user intends to continue the touch operation, the information processing apparatus 100 releases the invalidation of the movement of the touch position. Due to this, even if the user gets lost in moving the cursor position and rests in the middle, by restarting to move the touch position with the pointer, the user can continue the touch operation.

It is noted that, not limited to the invalidation time period, distance (invalidation distance) may be used as the invalidation condition. For example, if the touch position does not move exceeding the invalidation distance, the information processing apparatus 100 may invalidate the movement of the touch position. For example, the information processing apparatus 100 recognizes an allowable distance for the blurring caused when separating the pointer from the touch pad 107 as the invalidation distance. If the touch position moves exceeding the distance, the information processing apparatus 100 determines that it is the movement with user's intention. If the touch position moves less than the invalidation distance, the information processing apparatus 100 determines that it is the blurring caused when the pointer separates from the touch pad 107. Further, even it is within the invalidation time period, if the touch position moves the invalidation distance, which is set large, or more by one movement, the information processing apparatus 100 determines that the user intends to move the touch position. Thereby, the information processing apparatus 100 releases the invalidation. In this case, when releasing the invalidation, the information processing apparatus 100 sets the rest-state flag OFF.

The information processing apparatus 100 may change the invalidation time period and the invalidation distance in accordance with the time period during which the touch position rests. For example, if the touch position rests for a longer time period, the information processing apparatus 100 prolongs the invalidation time period and the invalidation distance. With the configuration like this, in a case where the user rests the touch position for a long time to surely determine the cursor position, the information processing apparatus 100 can invalidate the movement of unnecessary touch position for a long time or for a long distance.

The information processing apparatus 100 may change the invalidation time period and the invalidation distance for the movement in the lateral direction (in x-axis direction) and for the movement in the vertical direction (y-axis direction). For example, when selecting the character string, when moving in the lateral direction, only one character is shifted, which allows performing fine adjustment after the selection relatively easily. However, when moving in the vertical direction, the touch position moves to other row, which makes it difficult to perform fine adjustment after the selection. Thereby, the information processing apparatus 100 determines the movement direction of the touch position at the time of invalidation. If the touch position moves in the vertical direction, the information processing apparatus 100 prolongs the invalidation time period and the invalidation distance to invalidate the movement of the touch position for longer time period or the longer distance than that of the movement in the lateral direction.

The information processing apparatus 100 determines the movement based on the coordinates of the touch position of the pointer. Not limited to this, the information processing apparatus 100 can determine the movement based on the number of characters the cursor moves when selecting the character strings or the number of scales the slider bar moves. Further, the information processing apparatus 100 determines the rest state when the movement distance does not exceed the movement determination threshold. Not limited to this, the information processing apparatus 100 can determine the rest state using movement speed as threshold. Further, the rest state may be determined based on whether a time period during which the speed of the pointer continues to reduce (acceleration turns a negative value) exceeds a predetermined time period or not or whether degree of the speed reduction exceeds threshold or not. Further, the rest state may be determined based on whether pressure of the pointer pressing the input surface 400 exceeds threshold or not or whether a time period exceeding the threshold exceeds a predetermined time period or not. The information processing apparatus 100 performs processing to measure the rest-state determination time period and the invalidation time period every time the touch position is informed. Not limited to this, by activating a timer and when it expires, the information processing apparatus 100 may perform the processing after the lapse of the time period. Further, in case of FIG. 3C, the information processing apparatus 100 determines the lapse time of the invalidation time period once when separating the pointer, the lapse time may be determined every time the touch position is obtained and the flag may be set. In case of FIG. 3C, even after the pointer rests, by performing the processing to move the touch position, even in a case where the user operates with intension, it is possible to respond to the operation without delay. Only when the user intends to determine the cursor position by separating the pointer after the user moves and rests the cursor position to a position where the user desires, the cursor can be moved to the coordinates in the rest state. Thereby, the information processing apparatus 100 can perform the processing close to the user's intention.

In addition to the character string selection or operation of the slider bar, the information processing apparatus 100 as mentioned can be used to move the icon and image, to determine a trimming position, used to improve operability of magnification/reduction operation and rotating operation etc. by a multi-touch operation. It means that the information processing apparatus 100 of the present embodiment is effective to the one which determines operation position when separating the pointer from the touch pad.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium' to perform the functions of one or more of the above-described embodiment(s) and/or that includes one or more circuits (e.g., application specific integrated circuit (ASIC) for performing the functions of one or more of the above-described embodiment(s), and by a method performed by the computer of the system or apparatus by, for example, and reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g.) central processing unit (CPU), micro processing unit (MPU) and may include a network of separate computers or separate processors to read out and execute the computer executable instructions. The computer executable instructions may be provided to the computer, for example and from a network or the storage medium. The storage medium may include, for example, one or more of a hard disk, and a random-access memory (RAM), a read only memory (ROM), a storage of distributed computing systems, an optical disk (such as a compact disc (CD)) digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-149623, filed Jul. 29, 2015, which is hereby incorporated by reference wherein in its entirety.

What is claimed is:

1. An information processing apparatus comprising:
a position determination unit configured to repeatedly detect a touch position to be input to an input surface using a position detection sensor; and
a control unit configured to cause display image movement reflecting a change of the touch position detected by the position determination unit on the image displayed on a display,
wherein the control unit is further configured not to cause, on the image displayed on the display, display image movement reflecting the change of the touch position detected during a time period during which a predetermined condition is satisfied after the touch position detected by the position determination unit has rested for a predetermined time period or longer,
wherein the predetermined condition is that a lapse time from when the touch position detected by the position determination unit has rested for the predetermined time period or longer does not exceed a predetermined invalidation time period, and
wherein the predetermined invalidation time period is determined in accordance with a length of a time period during which the touch position has rested.

2. The information processing apparatus according to claim 1, further comprising an invalidation unit configured to invalidate the change of the touch position detected while the predetermined condition is satisfied after the touch position has rested for the predetermined time period or longer and to validate the change of the touch position if the predetermined condition is no longer satisfied,
wherein the control unit is further configured not to reflect the change of the touch position which is invalidated by the invalidation unit on the image displayed on the display, and
wherein the invalidation unit is further configured to invalidate the change of the touch position detected within a predetermined invalidation time period from a point when the change of the touch position is started detected again after the touch position is determined to have rested for the predetermined time period or longer and to validate the change of the touch position detected after a lapse of the predetermined invalidation time period.

3. The information processing apparatus according to claim 2,
wherein the invalidation unit is further configured to invalidate the change of the touch position if a total movement distance detected by the change of the touch position to be detected after the touch position is determined to have rested for the predetermined time period or longer is less than a predetermined invalidation distance and to validate the change by the total movement distance of the touch position if the total movement distance reaches the predetermined invalidation distance or more.

4. The information processing apparatus according to claim 3,
wherein the invalidation unit is further configured to set the predetermined invalidation time period or the predetermined invalidation distance in accordance with a time period until the touch position changes after the touch position is determined to have rested for the predetermined time period or longer.

5. The information processing apparatus according to claim 1, further comprising a determination unit configured to determine whether the predetermined condition is satisfied or not based on information with regard to the touch position detected by the position determination unit,
wherein the control unit is further configured to cause movement reflecting the change of the touch position on the image displayed on the display from a point when the determination unit determines that the predetermined condition is no longer satisfied.

6. The information processing apparatus according to claim 5,
wherein the movement caused to the image is movement of an indicator displayed on the display, and
wherein the determination unit is further configured to perform the determination when the indicator is displayed on the display.

7. The information processing apparatus according to claim 1, wherein the predetermined condition is that a length of a time period from when the touch position to be detected by the position determination unit has rested for the predetermined time period or longer to when the touch position is no longer detected is within a predetermined time.

8. The information processing apparatus according to claim 1, further comprising a rest-state determination unit configured to determine that the touch position rests in a case where the touch position detected by the position determination unit does not move from the touch position previously detected exceeding a predetermined distance.

9. The information processing apparatus according to claim 1,
wherein the movement caused to the image is movement of an indicator displayed on the display.

10. The information processing apparatus according to claim 1,
wherein the input surface is configured by a touch panel comprising the position detection sensor and the display which are integrally configured.

11. An information processing apparatus comprising:
a position determination unit configured to repeatedly detect a touch position to be input to an input surface using a position detection sensor; and
a control unit configured to cause display image movement reflecting a change of the touch position detected by the position determination unit on the image displayed on a display,
wherein the control unit is further configured not to cause, on the image displayed on the display, display image movement reflecting the change of the touch position detected during a time period during which a predetermined condition is satisfied after the touch position detected by the position determination unit has rested for a predetermined time period or longer,
wherein the predetermined condition is that a movement distance generated after the touch position detected by the position determination unit has rested for the predetermined time period or longer does not exceed a predetermined invalidation distance, and
wherein the predetermined invalidation distance is determined in accordance with a length of a time period during which the touch position has rested.

12. The information processing apparatus according to claim 11,
wherein the predetermined invalidation distance is determined in accordance with a direction in which the touch position moves.

13. An information processing apparatus comprising:
a position determination unit configured to repeatedly detect a touch position to be input to an input surface using a position detection sensor; and
a control unit configured to cause display image movement reflecting a change of the touch position detected by the position determination unit on the image displayed on a display,
wherein the position determination unit is further configured to determine that an object with which the touch position is input is separated from the input surface based on data obtained from the position detection sensor at a predetermined time interval, and wherein the control unit is further configured to, in a case where a length of a time period from when the object has rested for a predetermined time period or longer to when the object is determined as separated from the input surface is shorter than a predetermined time, move the image, reflecting the change of the touch position after the object has rested for the predetermined time period or longer, then, return the position of the image to a position which is a position of the image when the object is determined to have rested for the predetermined time period or longer, and display the image at the returned position.

14. A method of controlling an information processing apparatus, comprising:
displaying an image on a touch panel display, the image including an indicator which is moved by touch operation;
repeatedly detecting a touch position to be input to the touch panel display;
moving the indicator in accordance with a change of the detected touch position;
determining that the touch position has rested for a predetermined time period or longer; and
controlling not to move the indicator when the change of the touch position is detected during a time period in a case where a length of the time period from when the touch position is determined to have rested for the predetermined time period or longer to when the touch position is no longer detected satisfies a predetermined condition,
wherein the predetermined condition is that a lapse time from when the touch position detected has rested for the predetermined time period or longer does not exceed a predetermined invalidation time period, and
wherein the predetermined invalidation time period is determined in accordance with a length of a time period during which the touch position has rested.

15. A method of controlling an information processing apparatus, comprising:
displaying an image on a touch panel display, the image including an indicator which is moved by touch operation;
repeatedly detecting a touch position to be input to the touch panel display;
moving the indicator in accordance with a change of the detected touch position;
determining that the touch position has rested for a predetermined time period or longer; and
controlling not to move the indicator when the change of the touch position is detected during a time period in a case where a length of the time period from when the touch position is determined to have rested for the predetermined time period or longer to when the touch position is no longer detected satisfies a predetermined condition,
wherein the predetermined condition is that a movement distance generated after the touch position detected has rested for the predetermined time period or longer does not exceed a predetermined invalidation distance, and
wherein the predetermined invalidation distance is determined in accordance with a length of a time period during which the touch position has rested.

* * * * *